United States Patent [19]

Christmann et al.

[11] 3,900,525

[45] Aug. 19, 1975

[54] MANGANESE FERRITE CATALYZED OXIDATIVE DEHYDROGENATION

[75] Inventors: Harold F. Christmann, Seabrook; Paul H. Teel, Houston, both of Tex.

[73] Assignee: Petro-Tex Chemical Corporation, Houston, Tex.

[22] Filed: June 3, 1974

[21] Appl. No.: 475,786

Related U.S. Application Data

[62] Division of Ser. No. 253,820, May 16, 1972, Pat. No. 3,843,745, which is a division of Ser. No. 11,289, Feb. 3, 1970, abandoned.

[52] U.S. Cl. ................. 260/680 E; 260/669 R
[51] Int. Cl. ................................................ C07c 5/18
[58] Field of Search ................... 260/669 R, 680 E

[56] References Cited
UNITED STATES PATENTS

| | | | |
|---|---|---|---|
| 2,697,066 | 12/1954 | Sieg | 208/136 |
| 3,420,912 | 1/1969 | Woskow et al. | 260/680 E |
| 3,526,675 | 9/1970 | Croce et al. | 260/680 E |
| 3,567,793 | 3/1971 | Colling et al. | 260/680 E |
| 3,671,606 | 6/1972 | Manning | 260/680 E |
| 3,828,101 | 8/1974 | Miklas | 423/594 |
| 3,843,745 | 10/1974 | Christmann et al. | 260/680 E |
| 3,849,545 | 11/1974 | Miklas | 423/594 |

*Primary Examiner*—Paul M. Coughlan, Jr.
*Attorney, Agent, or Firm*—N. Elton Dry; Kenneth H. Johnson

[57] ABSTRACT

Improved catalysts for dehydrogenation can be prepared by coprecipitating the metal containing catalysts from a solution of metal ions in the presence of a high molecular weight polyhydric material such as potato starch. The result of having the polyhydric material present is that the precipitate has the form of a gelatinous precipitate of improved processability. The catalyst itself is more active in dehydrogenations and physically stronger than comparable catalyst prepared by conventional methods.

9 Claims, No Drawings

MANGANESE FERRITE CATALYZED OXIDATIVE DEHYDROGENATION

This application is a division of Ser. No. 253,820 filed May 16, 1972, U.S. Pat. No. 3,843,745, which was a division of Ser. No. 11,289 filed Feb. 3, 1970, now abandoned.

BACKGROUND OF THE INVENTION

This invention relates to improved dehydrogenation catalysts, their method of preparation, particularly catalysts for oxidative dehydrogenations and the method of using such catalyst.

The types of dehydrogenation catalysts known are quite varied. The present invention is concerned with those dehydrogenation catalysts which comprise a metal compound or mixture of metal compounds. Such compounds include the metal oxides, metal salts such as the halides, phosphates, sulfates, molybdates, tungstates, and the like. Generally, these catalysts can be characterized as compounds containing a metal having a polyoxidation state, i.e., a metal having at least two oxidation states, in addition to the zero state. Suitable metals are found in Groups IVB, VB, VIB, VIIB, VIII, IB, IVA, VA and VIA of the Periodic Table* of elements. Particularly useful polyoxidation state metals are Ti, V, Cr, Mn, Fe, Co, Ni, Cu, Nb, Mo, Ru, Rh, Pd, Sn, Sb, W, Re, Os, Ir, Pt, Au, Hg, Tl, Pb, Bi, and Po. It has been found that instant process is particularly suitable for the preparation of oxidative dehydrogenation catalyst. Some excellent oxidative dehydrogenation catalysts include stannic phosphate, lead molybdate, aluminum tungstate, cobalt tungstate, iron oxide, antimony oxide, bismuth molybdate, chromium oxide, tungsten oxide, vanadium oxide and the like. Suitable oxidative dehydrogenation catalysts can contain one such polyoxidation state metal or a mixture of such metal compounds. Very often these catalysts will be employed in various combinations with each other as for example lead molybdate/aluminum tungstate, lead molybdate/cobalt tungstate, iron oxide/chromium oxide, iron oxide/vanadium oxide, iron oxide/manganese oxide, etc.

*Handbook of Chemistry and Physics, 45th Ed., 1964-1965, The Chemical Rubber Co., Cleveland, Ohio, p. B-2.

In addition to the polyoxidative state metal, the dehydrogenation catalysts of the present invention can also contain one or more mono-oxidation state metals which act as promoters, initiators, stabilizers and the like. The single oxidation state metal or metal compounds include metals from Group IA, IIA, IIIB, IVB, VB, VIIB, IB, IIB, IIIA and IVA, preferably the divalent metals in these Groups. Specifically among those that are often found in oxidative dehydrogenation catalytic systems are Mg, Al, Ca, Sc, Zn, Sr, Cd and Ba. Aluminum oxide in the form of natural or synthetic molecular sieves has been found to be an effective oxidative dehydrogenation catalyst as shown in U.S. Pat. Nos. 3,173,855 and 3,247,278. Also found in the oxidative dehydrogenation catalysts are compounds of Be, the lanthanides, La, Hf, Ta, Ce, Pr, Nd, Pm, Sm, Eu, Gd, Tb, Dy, Ho, Er, Tm, Yb, Lu, Di (used to describe a mixture of rare earths, e.g. a $Di_2O_3$ is typically 45 to 46 percent $La_2O_3$, 1 to 2 percent $CeO_2$, 9 to 10 percent $Pr_6O_{11}$, 32 to 33 percent $Nd_2O_3$, 5 to 6 percent $Sm_2O_3$, 3 to 4 percent $Gd_2O_3$, 0.4 percent $Yb_2O_3$ and 1 to 2 percent other rare earths), the actinides, (e.g. Th, pa,) Ge Ga, Y, Zn, Se, Te, and In.

In addition to the metals the catalysts often contain various non-metallic components which also serve as promoters, initiators, stabilizers or the like. Alkali metal compounds are frequently present in the oxidative dehydrogenation catalyst in limited quantities such as $Li_2O$, $Na_2O$ and $K_2O$. Other additives are sulfur, phosphorous, silicon, boron or mixtures thereof, for example, sulfates, sulfites, sulfides, alkylmercaptans, sulfuric acid, phosphates, phosphoric acid, silica, silicates, boron trifluoride and the like. Such additives are disclosed in U.S. Pat. Nos. 3,247,278; 3,270,080; 3,303,238; 3,324,195; 3,398,100.

Halogen is also often present in oxidative dehydrogenation to improve the results. The presence of halogen in the dehydrogenation zone is particularly effective when the compound to be dehydrogenated is saturated, such as a saturated hydrocarbon. The halogen present in the dehydrogenation zone may be either elemental halogen or any compound of halogen which would liberate halogen under the conditions of reaction. Suitable sources are such as hydrogen iodide, hydrogen bromide and hydrogen chloride, ethyl iodide, methyl bromide, methyl chloride, 1,2-dibromoethane, ammonium iodide, ammonium bromide, ammonium chloride, sulfuryl chloride, etc. The halogen may be liberated partially or entirely by a solid source as shown in U.S. Pat. No. 3,130,241. Mixture of halogens and halogen sources can be used. The amount of halogen, calculated as elemental halogen, may be as little as about 0.0001 or less mole of halogen per mole of organic compound to be dehydrogenated to as high as 0.2 or 0.5. The use of halogens in oxidative dehydrogenations is shown in U.S. Pat. Nos. 3,210,436; 3,207,805 – 3,207,810; 3,277,207; 3,278,626; 3,308,182 – 3,308,200; 3,316,320; 3,356,750; 3,359,343; 3,374,283; 3,382,290; 3,440,298; 3,442,968.

In addition to the catalysts described above the following U.S. Patents further described oxidative dehydrogenation catalysts generally contemplated by the instant invention: U.S. Pat. Nos., 3,420,911;, 3,420,912, 3,428,703; 3,440,299; 3,260,767; 3,274,285; 3,284,536; 3,303,234–7; 3,320,329; 3,334,152; 3,336,408; 3,342,890; 3,404,193; 2,437,703; 3,446,869; 3,456,030.

Among the preferred catalysts of this invention are those which contain iron, oxygen and at least one other metallic element Me. The catalysts comprise crystalline compositions of iron, oxygen, and at least one other metallic element Me. The catalysts comprise ferrites. Ordinarily, the ionic radius of the second metallic ingredient(s) Me is small enough that the oxygen anions are not spread too far apart. That is, the elements must be able to form a crystalline structure with the iron and oxygen.

A preferred type of catalyst of this type is that having a face-centered cubic form of crystalline structure. Examples of this type of catalyst are ferrites of the general formula $MeO \cdot Fe_2O_3$ where Me is a divalent metal cation such as $Mg^{++}$ or $Ni^{++}$. However, if the cations are large, such as $Sr^{++}$ (1.35 A), the spinel structure may not occur and other types of ferrites having a hexagonal crystal of the type $SrO \cdot 6Fe_2O_3$ may be formed. These hexagonal ferrites are within the scope of the definition of catalysts of this invention.

Suitable catalysts may also be ferrites wherein other metals are partially substituted for the iron. For example, atoms having a valence of +3 may be partially substituted for some of the Fe+++ atoms. Also, metal atoms having a valence of +4 may replace some of the Fe+++ ions. However, the catalysts will still suitably have iron present in an amount described above in relation to the total atoms of the second metallic ingredient(s).

The catalysts may have the iron combined in crystalline structure with oxygen and more than one other metallic element, as mentioned above. For example, a preferred type of ferrite is that essentially or approximately of the formula, $MeFe_2O_4$, where Me represents a divalent metal ion with an ionic radius approximately between 0.5 and 1.1 A., preferably between about 0.6 to 1.0 A. In the case of simple ferrites, Me may be, e.g., one of the divalent ions of the transition elements as Mg, Ca, Sr, Ba, Cr, Mn, Co, Ni, Zn, or Cd. However, a combination of these ions is also possible to form a ferrite such as $Ni_{0.5}Mg_{0.5}Fe_2O_4$ or $Ni_{0.25}Mg_{0.75}Fe_2O_4$. Moreover, the symbol Me may represent a combination of ions which have an average valency of two. However, it is essential that the crystalline structure contain iron and the metallic element other than iron.

Examples of catalysts are such as magnesium ferrite, cobalt ferrite, nickel ferrite, zinc ferrite, barium ferrite, strontium ferrite, manganese ferrite, calcium ferrite, cadmium ferrite, silver ferrite, zirconium ferrite, and rare earth ferrites such as cerium ferrite or mixtures of ferrites, such as ferrites containing iron combined with at least one element selected from the group consisting of Mg, Zn, Ni, Co, Mn, Cu, Cd, Ca, Ba, Sr, Al, Cr, Ti, V, Mo, W, Na, Li, K, Sn, Pb, Sb, Bi, Ga, Ce, La, Th, Pr, Nd, Pm, Sm, Eu, Gd, Tb, Dy, Ho, Er, Tm, Yb, Lu and mixtures thereof, with a preferred group being Mg, Ca, Sr, Ba, Mn, Cr, Co, Ni, Zn, Cd, and mixtures thereof, and particularly preferred metals being Mg or Mn. Examples of mixed ferrites are magnesium ferrite plus zinc ferrite, magnesium ferrite plus nickel ferrite, magnesium ferrite plus cobalt ferrite, magnesium ferrite plus nickel ferrite plux zinc ferrite, magnesium ferrite plus manganese ferrite. As explained above, these ferrites may be physical mixtures of the ferrites of may contain crystals wherein the different metallic atoms are contained in the same crystal; or a combination of physical mixtures and chemical combinations. Some examples of a chemical combination would be magnesium zinc ferrite, magnesium chromium ferrite, zinc chromium ferrite and lanthanum chromium ferrite.

The valency of the metals in the catalysts do not have to be any particular values, although certain combinations are preferred or disclosed elsewhere. The determination of the valency of the ions is sometimes difficult and the results are uncertain. The different ions may exist in more than one valency state. However, a preferred catalyst is one which has the iron predominately in the Fe+++ state. Some ferrites are described in Ferromagnetism, by Richard M. Bozorth (D. Van Nostrand Co., Inc., 1951), which disclosure is hereby incorporated by reference.

Although the ferrite catalysts may be broadly defined as containing crystalline structures of iron, oxygen and the second metallic ingredient(s), certain types of catalysts are preferred. Valuable catalysts were produced comprising as the main active constituent in the catalyst surface exposed to the reaction gases, iron, oxygen and at least one element selected from the group of Mn, or Periodic Table Groups IIA, IIB or VIII such as those selected from the group consisting of magnesium, manganese, calcium, cadmium, cobalt, zinc, nickel, barium, strontium, and mixtures thereof. Preferred catalysts have iron present as the predominant metal in the catalyst exposed in the reaction gases.

A preferred class of catalysts containing two second metallic ingredients are those of the basic formula $Me_aCr_bFe_cO_4$ where $a$ can vary within the range of about 0.1 to about 3, $b$ can vary from greater than 0 to less than 2 and $c$ can vary from greater than 0 to less than 3. Me can be any of the metallic ingredients, other than chromium, previously described, particularly Periodic Table Groups IIA, IIB, III and VIII. In particular, the metals from these groups that are desirable are Mg, Ba, La, Ni, Zn and Cd.

The preferred compositions exhibit a certain type of X-ray diffraction pattern. The preferred compositions do not have any sharp X-ray diffraction reflection peaks as would be found, e.g., in a highly crystalline material having the same chemical composition. Instead, the ferrite composition of this invention exhibit reflection peaks which are relatively broad. The degree of sharpness of the reflection peak may be measured by the reflection peak band width at half height (W $h/2$). In other words, the width of the reflection peak as measured at one-half of the distance to the top of the peak is the "band width at half height." The band width at half height is measured in units of °2 theta. Techniques for measuring the band widths are discussed, e.g., in Chapter 9 of Klug and Alexander, X-ray Diffraction Procedures, John Wiley and Son, N.Y., 1954. The observed band widths at half height of the preferred compositions of this invention are at least 0.16 °'theta and normally will be at least 0.20 °2 theta.* For instance, excellent compositions have been made with band widths at half height of at least 0.22 or 0.23 °2 theta. The particular reflection peak used to measure the band width at one-half height is the reflection peak having Miller (hkl) indices of 220. See, e.g., Chapter of Klug and Alexander, ibid). Applicants do not wish to be limited to any theory of the invention in regard to the relationship between composition activity and band width.

*The powder diffraction patterns may be made, e.g., with a Norelco constant potential diffraction unit type No. 12215/0, equipped with a wide range goniometer type No. 42273/0, cobalt tube type No. 32119, proportional counter type No. 57250/1; all coupled to the Norelco circuit panel type No. 12206/53. The cobalt K alpha radiation is supplied by operating the tube at a constant potential of 30 kilovolts and a current of 10 milliamperes. An iron filter is used to remove K beta radiation. The detector voltage is 1660 volts and the pulse height analyzer is set to accept pulses with amplitudes between 10 and 30 volts only. Slits used are divergence 1°, receiving 0.006 inches and scatter 1°. Strip chart recordings for identification are made with a scanning speed of ¼° per minute, time constant 4 seconds and a full scale at $10^3$ counts per second. No correction is made for $K\alpha$ doublet or instrumental broadening of the band widths.

Suitable preferred ferrites according to this invention are zinc ferrites having X-ray diffraction peaks within the d-spacings 4.83 to 4.89, 2.95 to 3.01, 2.51 to 2.57, 2.40 to 2.46, 2.08 to 2.14, 1.69 to 1.75, 1.59 to 1.65 and 1.46 to 1.52, with the most intense peak being between 2.51 to 2.57; manganese ferrite having peaks at d spacings within or about 4.87 to 4.93, 2.97 to 3.03, 2.50 to 2.58, 2.09 to 2.15, 1.70 to 1.76, 1.61 to 1.67, and 1.47 to 1.53 (with other peaks) with the most intense peak being between 2.52 to 2.58; magnesium ferrites having peaks between 4.80 to 4.86, 2.93 to 2.99, 2.49 to 2.55 2.06 to 2.12, 1.68 to 1.73, 1.58 to 1.63 and 1.45 to 1.50 with the most intense peak being between 2.49 and 2.55; and nickel ferrites having peaks within the d spacings of 4.79 to 4.85, 2.92 to 2.98, 2.48 to 2.54, 2.05 to 2.11, 1.57 to 1.63 and 1.44 to 1.49, with the most intense peak being within 2.48 to 2.54. The preferred manganese ferrites are those having the Mn predominately present as a valence of plus 2.

Ferrite formation may be accomplished by reacting an active compound of iron with an active compound of the designated metals. By active compound is meant a compound which is reactive under the conditions to form the ferrite. Starting compounds of iron or the other metal may be such as the nitrates, hydroxides, hydrates, oxalates, carbonates, acetates, formates, halides, oxides, etc. The starting compounds are suitably oxides or compounds which will decompose to oxides during the formation of the ferrite such as organic and inorganic salts or hydroxides. For example, manganese carbonate may be reacted with iron oxide hydrates to form manganese ferrite.

The catalysts may contain an excess of iron over the stoichiometric amount to form the ferrite. For example, in a ferrite of the type $MeFe_2O_4$ the stoichometric amount of iron would be 2 atoms per atom of Me. The iron (calculated as $Fe_2O_3$) may be present in an amount of at least about 10 percent in excess of the stoichiometric amount and preferably may be present in an amount of at least 14 percent in excess. Suitable ranges of iron are from about 10 to 200 percent excess. Similarly the catalysts may contain an excess of the Me over the stoichiometric amount required.

The metal ferrite catalysts prepared according to the present invention can have higher ratios of iron to metal than were possible before. This allows lower inlet temperatures and lower operating temperatures for the dehydrogenation in which the catalysts are employed. Catalysts prepared by prior art methods to give high ratios of iron to metal exhibit a rapid time trend in dehydrogenation use, i.e. selectivity loss is very rapid with time in use.

Various methods have been employed to prepare dehydrogenation catalyst. Although the catalyst may be comprised of a single compound such as iron oxide, it has more often been the case that cocatalysts possess advantages over the single components such as a magnesium - iron oxide. Also as pointed out above various metal and non-metal promoters, initiators, stabilizers and the like are often desirable. These catalysts have been prepared by precipitation by dry or wet milling or mixing, by precipitation of one of the ingredients in the presence of the other, coprecipitation and impregnation of one or more of the solid ingredients with aqueous or non-aqueous solution(s) of salt(s) of the additional ingredients(s).

For example, one method previously used for preparing a lead molybdate/cobalt tungstate was by mixing a soluble salt of lead and a soluble molybdate salt. The lead molybdate is washed free of electrolyte and slurried with an aqueous solution of a soluble cobalt salt which is precipitated as the tungstate by mixing with a soluble tungstate salt. The resulting precipitate is washed free of electrolyte, dried and calcined. Metal ferrite oxidative dehydrogenation catalysts, for example magnesium ferrite, have been prepared by contacting magnesium oxide pellets with a solution of ferric nitrate, drying and calcining. Ferric oxide catalyst per se is often prepared by precipitation, i.e. a solution of a soluble salt of iron, $FeCl_3$ is precipitated by the addition of a base, NaOH to form $Fe(OH)_3$, a genatinous precipitate which is then dehydrated.

The prior methods of dehydrogenation catalyst preparation can broadly be divided into two categories, (1) precipitation including co-precipitation, (2) physical mixing including dry and wet mixing and deposition of one ingredient from a solution onto a second ingredient. Commercial catalysts are prepared by both general methods. It has been observed, however, that catalysts prepared according to one or the other broad categories set out above exhibit more or less intrinsic weakness which it is an object of the present invention to overcome.

Catalysts prepared as in category (1) above have been found to be generally weak in physical resistance. Care is necessary in handling such catalyst and usually they must be employed in beds since their rate of attrition precludes their economic use in fluidized or moving bed systems. These catalysts, however, have the advantage in multi-component catalyst systems of having very intimate contact of the components. The catalysts prepared by the method of category (2) can have the disadvantages as set out above, although usually one component or the carrier is selected for physical strength, but will have as a principal inherent disadvantage, a somewhat non-homogenous character, that is to say, in multi-component catalyst systems there will not be the same degree or type of intimate relationship achieved with the precipitation methods.

SUMMARY OF THE INVENTION

The present invention provides a new method of preparing dehydrogenation catalysts which have the intimate contact desirable and possible from the precipitation methods of preparation and yet have physical strength superior to the precipitated catalyst.

In the case of oxidative dehydrogenation catalysts several other improvements are obtained by the present invention including the use of higher oxygen to hydrocarbon ratios without substantial loss of selectivity thus higher yields; lower inlet temperatures; and longer catalyst life than analogous but conventionally prepared catalysts, under similar operating conditions.

Another advantage found with the present catalysts is the increased control of the reaction. Oxidative dehydrogenation reactions are exothermic thus some means must be kept employed to control the temperature. Two particular means are heat exchanger for heat removal or a diluent, such as steam, in the feed stream. In either case the instant catalysts provide greater control, but in the adiabatic process it has been found that the quantity of steam diluent can be reduced from that normally required thus effecting a substantial utility savings.

Briefly stated, one aspect of the present invention is an improvement in the method of preparing a catalyst for use in dehydrogenation comprising contacting a solution of soluble metal component with a precipitating agent to precipitate an insoluble metal component wherein the improvement comprises having present with the soluble metal component a high molecular weight soluble polyhydric organic compound. As used herein and in the claims the term metal component is understood to mean a single metal compound or mixture of metal compounds having the same or different anions and/or cations.

The mechanism of the polyhydric material is not fully understood. It is possible for some polyhydric compounds to form complexes with metals, however, this does not appear to be essential to the present invention. The high molecular weight of the polyhydric material imparts polymeric qualities of viscosity and surface tension to the solution. The term polyhydric is used to describe a material having at least two and preferably three or more hydroxyl groups or groups that produce hydroxyl groups under conditions of the preparation. The term high molecular weight is used to mean a material having a molecular weight of at least 3000 (number average) or more. The term soluble is used to indicate that the polyhydric material is sufficiently soluble to give the improved catalyst. It is also generally expected that the precipitating medium will be aqueous, however, it is contemplated that other solvents can be employed within the scope of this invention.

The molecular weight of the soluble polyhydric organic compounds is not critical, but it should be appreciated that lower molecular weights than about 3000 do not provide a satisfactory environment for the formation of the gel. It is preferred that the molecular weight is at least 4,000 with the upper limit being set by solubility consideration and also the viscosity of the precipitating medium. Since the precipitating agent must contact the metal ions, the viscosity of the precipitating medium can not be too great. Generally, soluble polyhydric materials that will allow mixing of the metal ions and precipitating agent will not have molecular weights of greater than 400,000.

The polyhydric organic compounds contemplated include polyhydric alcohols, including polyesters such as those derived from polybasic acids as adipic, succinic, sebacatic, azelaic and phthalic; polyols as pentaerythritol xylitol and sorbitol; polyethers such as the condensation products of ethylene oxide, propylene oxide and mixtures thereof with polyols such as glycerol, pentaerythritol, xylitol, sorbitol and polysaccharides; and hydrolyzed polymers such as polyvinyl acetate to polyvinyl alcohol. The polyesters and polyethers are widely known and commercially used in the preparation of polyurethane films and foams.

The term polysaccharide is used to describe a polymer having more than two sugar units. Of course, the molecular weight consideration would preclude the inclusion of simple sugars, disaccharides, trisaccharides, etc., but could include some octa- and nonosaccharides. A particularly preferred class of polyhydric compounds is polysaccharides having a molecular weight at least about 3,000. Included are polysaccharides containing repeating units of a single monosaccharide (homoglycans) or mixtures monosaccharide units (heteroglycans), for example, L-fructose, xylan, D-xylose (mono) and tragacanth, D-xylose and D-galacturonic acid (hetero). The polysaccharides can contain substituents such as amino sugar units, pentose sugar units, uronic sugar units, sugar groups containing ethers and the like. The polysaccharides can be linear or branched, although branched polysaccharides, which constitute a preferred class herein, exhibit better solubility and are less likely to undergo retrogradation than the linear polysaccharides. The type of glycosidic linkage does not appear to be critical though generally the 1 – 4 and 1 – 6 linkages are usually employed because of their abundance.

Some examples of useful polysaccharides are xylan, amylopectins, amylose, fructans, fucan, floridean starch, glycogens, starches, levans, dextrans, capreolan yeast glucan and gums and mucilages such as carob, tragacanth, locust bean, guaran, cashew, lemon, karaya, ghatti, cholla, arabic and damson. A preferred group of polysaccharides is selected from the group consisting of potato starch, corn starch, tapioca starch, arrowroot starch, gun arabic, gun tragacanth and dextran.

The high molecular weight polyhydric organic compound is typically present in the metal ion solution in the range of about 0.1 to 11 percent by weight based on the weight of metal in the metal component, or more usually 0.1 to 4 percent by weight based on the weight of metal in the metal component.

Soluble metal salts are known for essentially all metals. In specific regard to the metal components of the present invention the following soluble metal compounds are illustrative; titanium trichloride, vanadium diiodide, chromium (III) nitrate, manganese (II) titanate, iron (III) nitrate, cobalt (II) acetate, nickel nitrate, copper nitrate, niobium potassium fluoride, molybdenum dioxydichloride, ruthenium tetrachloride, rhodium dioxide, palladium chloride, stannous chloride, antimony trichloride, tungsten dioxydichloride, rhenium trichloride, osmium trichloride, iridium tribromide platinum tetrachloride, gold chloride, mercuric nitrate, thallium acetate, lead fluorosilicate, bismuth dioxide, polonium tetrachloride, magnesium selenate, aluminum bromate, calcium chloride, scandium chloride, zinc sulfate, strontium tetrasulfide, cadmium sulfate, barium trisulfide, beryllium bromide, lanthanum heptahydrate chloride, cesium carbonate, germanium tetrafluoride, europium iodide, gallium nitrate, selenium oxide, indium trichloride and the like.

In addition to compounds of the type listed above, less soluble compounds can be employed in conjunction with other materials and techniques which will increase solubility. For example, many insoluble compounds e.g., $Fe_2O_3$ and $MgO$, are soluble in hot concentrated acids. The addition of a cooled solution thereof to an alkaline solution will result in the precipitation of the insoluble hydroxide. Such techniques and manipulations are well known in the art and their application in the operation of the process of the present invention is contemplated.

The precipitating agent is any compound which contains an ion which when reacted with the metal ion portion or portions of the catalyst forms an insoluble compound. In a large number of cases an alkaline material such as sodium hydroxide, ammonium hydroxide, potassium hydroxide or the like will cause an insoluble hydroxide to form, e.g. $Fe(OH)_3$, $Cr(OH)_3$, $Ni(OH_3)$. Some examples of insoluble compounds prepared from soluble compounds are lead molybdate from lead nitrate and sodium molybdate, aluminum molybdate from aluminum nitrate and sodium tungstate, cobalt tungstate from cobalt nitrate and sodium tungstate, and so forth.

The catalyst preparations are generally carried out at atmospheric pressure, although either sub or super atmospheric pressures, for example 0.5 to 50 atmospheres, can be employed if the conditions warrant. Temperature of the catalyst precipitation are relatively mild being at approximately room temperature (about 25°C.). Temperatures lower than room can be employed so long as the reactants are sufficiently soluble, generally temperatures no lower than 20°C. will be employed. Higher temperatures can be employed to improve the solubility of the reactants, but generally there is no need to exceed about 100°C. At higher temperatures, i.e. 30°–50°C. or higher, the viscosity effect obtained from the molecular weight polyhydric compound is decreased.

The solutions containing the metal ion and the precipitation agent can be contacted in any of the ways previously employed for precipitation known and used in the prior art. The two solutions can be mixed together with mild or vigorous agitation depending on the size of particles desired. The metal ion containing solution is conveniently sprayed in to a solution of the precipitating agent in the form of droplets or a steady stream. The droplets produce spheres of catalyst and the steady stream a cylindrical tape catalyst. The catalysts prepared according to this invention have been found to have excellent reactivity in oxidative dehydrogenations and superior strength. The catalysts of this invention are suitable for both fixed and moving bed operations, such as a fluidized bed. In the preparation of the catalysts the high molecular weight polyhydric organic compound is added to the solution of metal ions. Generally, if the ionic metal solution were prepared by heating, the solution is cooled prior to adding the polyhydric compound, usually to 100°C, or less, preferably 50°C. or less.

The precipitate which is obtained is a gelatinous material that is easily filtered. Previously the precipitates obtained were extremely difficult to process because of their tendency to clog the filtering means. The recovered filtrate is washed and dried.

The catalyst thus obtained can be used without further treatment, however, greater activitty and selectivity are noted when the catalysts are activated by heating at elevated temperatures, e.g. 400°–1,100°C. in a controlled atmosphere, e.g. air, nitrogen, helium, a reducing atmosphere such as hydrogen, carbon monoxide and the like.

Metal ferrites may be obtained by conducting the reaction to form the ferrites at relatively low temperatures, that is, at temperatures lower than some of the very high temperatures used for the formation of ferrites prepared for semiconductor application. The very intimate relationship of the metal ferrite reactants obtained by the co-precipitation of the present invention facilitates the reaction. Generally the temperature of reaction for the formation of metal ferrites will be less than 1,300°C. and preferably less than 1,150°C. The reaction time at the elevated temperature in the formation of the metal ferrite catalyst may run from 5 minutes to 4 hours. Some improvmement in the catalytic activity of metal ferrites may be obtained by reducing the catalyst. The reduction may be accomplished prior to the initial dehydrogenation, or after the catalyst has been used. The reduction may be accomplished with any effective reducing gas which is capable of reducing iron to a lower valence such as hydrogen, carbon monoxide, or hydrocarbons. The temperature of reduction can be from 200° to 900°C. or higher.

The preparation of catalysts is often described as an art. Experienced researchers and chemists often have difficulty reprducing a particular catalyst. This defect is even more often encountered in commercial production of catalysts. The gel precipitation method of the present invention adds the intangible but extremely value asset of giving an easily handled catalyst preparation method for preparing catalysts having consistent properties. The catalysts of this invention can be applied to the dehydrogenation of a wide variety of organic compounds. Such compounds normally will contain from 2 to 20 carbon atoms, at least one

grouping, having a boiling point below about 350°C. and may contain other elements, in addition to carbon and hydrogen such as oxygen, halogens, nirogen anc sulfur. Preferred are compounds having 2 to 12 carbons atoms, and especially preferred are compounds ot 3 to 6 or 8 carbon atoms.

Among the types of organic compounds which may be dehydrogenated by means of the process of this invention are nitriles, amines, alkyl halides, ethers, esters aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile propionaldehyde to acrolein; ethyl chloride to vinyl chloride; methyl isobutyrate to methyl methacrylate, 2 or 3 chlorobutene-1 or 2, 3 dichlorobutane to chloroprene; ethyl pyridine to vinyl pyridine; ethylbenzene to styrene; isopropylbenzenene to α-methyl styrene: ethylchlorohexane to styrene; cyclohexane to benzene: ethane to ethylene to acetylene; propane to propylene or methyl acetylene, allene, or benzene; isobutane to isobutylene; n-butane to butene and butadiene-1,3; n-butene to butadiene-1,3 and vinyl acetylene; methyl butene to isoprene; cyclopentane to cyclopentene and cyclopentadiene-1,3; n-octane to ethyl benzene and ortho-xylene; monomethyl-heptanes to xylenes; ethyl acetate to vinyl acetate; 2,4,4-trimethylpentane to xylenes; and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such as the conversion of propene to diallyl. Representative materials which are dehydrogenated by the novel process of this invention include ethyl toluene, alky: chlorobenzenes, ethyl naphthalene, isobutyronitrile propyl chloride, isobutyl chloride, ethyl fluoride, ethyl bromide, n-pentyl iodine, ethyl dichloride, 1,3 dichlorobutane, 1,4 dichlorobutane, the chlorofluoroethanes methyl pentane, methylethyl ketone, diethyl ketone n-butyl alcohol, methyl propionate, and the like.

Suitable dehydrogenation reactions are the following: acyclic compounds having 4 to 5 non-quarternary contiguous carbon atoms to the corresponding olefins diolefins or acetylenes having the same number of carbon atoms; aliphatic hydrocarbons having 6 to 16 carbon atoms and at least one quaternary carbon atom tc aromatic compounds, such as 2,4,4-trimethyl-pentene-1 to a mixture of xylenes; acyclic compounds having 6 to 16 carbon atoms and no quaternary carbon atoms tc aromatic compounds such as n-hexenes to benzene; cycloparaffins and cycloolefins having 5 to 8 carbon atoms to the corresponding olefin, diolefin or aromatic compound, e.g., cyclohexane to cyclohexene or cyclohexadiene or benzene; aromatic compounds having 8 to 12 carbon atoms including one or two alkyl side chains of 2 to 3 carbon atoms to the corresponding aromatic with unsaturated side chain such as ethyl benzene to styrene.

The preferred compounds to be dehydrogenated are hydrocarbons with a particularly preferred class being acyclic non-quaternary hydrocarbons having 4 to 5 contiguous carbon atoms or ethyl benzene and the preferred products are n-butene-1 or 2, butadiene-1,3, vinyl acetylene, 2-methyl-1-butene, 3-methyl-1-butene, 3-methyl-2-butene, isoprene, styrene or mixutres thereof. Especially preferred as feed are n-butene-1 or 2 and the methyl butenes and mixtures thereof such as hydrocarbon mixtures containing these compounds in at least 50 mol percent.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less then about 75 p.s.i.a. and excellent results are obtained at about atmospheric pressure.

The organic compound to be dehydrogenated is contacted with oxygen in order for the oxygen to oxidatively dehydrogenate the compound. Oxygen may be fed to the reactor as pure oxygen, as air, as oxygen-enriched air, oxygen mixed with diluents, and so forth. Oxygen may also be added in increments to the dehydrogenation zone. Although determinations regarding the mechanism of reaction are difficult, the process of an oxidative dehydrogenation process is one wherein the predominant mechanism is by the reaction of oxygen with the hydrogen released from the hydrocarbon.

The amount of oxygen employed may vary depending upon the desired result such as conversion, selectivity and the number of hydrogen atoms being removed. Thus, to dehydrogenate butane to butene requires less oxygen than if the reaction proceeds to produce butadiene. Normally oxygen will be supplied (including all sources, e.g. air to the reactor) in the dehydrogenation zone in an amount from about 0.2 to 1.5, preferably 0.3 to 1.2, mols per mol of $H_2$ being liberated from the organic compound. Ordinarily the mols of oxygen supplied will be in the range of from .2 to 2.0 mols per mol of organic compound to be dehydrogenated and for most dehydrogenations this will be within the range of 0.25 to 1.5 mols of oxygen per mol of organic compound. Among the advantages noted are that the instant catalysts will allow higher ratios of oxygen to hydrocarbon than catalyst prepared conventionally. Higher oxygen to hydrocarbon ratios generally provide higher conversions with a corresponding decrease in selectivity, however, the catalysts of the present invention do not exhibit as rapid a decrease in selectivity as the analogous conventionally prepared catalyst thus providing higher yields than were possible previously.

Frequently, the reaction mixture contains a quantity of steam or diluent such as nitrogen with the range generally being between about 2 and 40 mols of steam per mol of organic compound to be dehydrogenated. Preferably, steam will be present in an amount from about 3 to 35 mols per mol of organic compound to be dehydrogenated and excellent results have been obtained within the range of about 5 to about 30 mols of steam per mol of organic compound to be dehydrogenated. The functions of the steam are several-fold, and the steam may not merely act as a diluent. Diluents generally may be used in the same quantities as specified for the steam. These gases serve also to reduce the partial pressure of the organic compound.

The temperature for the dehydrogenation reaction generally will be at least about 250°C., such as greater than about 300°C. or 375°C., and the maximum temperature in the reactor may be about 700°C. or 800°C. or perhaps higher such as 900°C. under certain circumstances. However, excellent results are obtained within the range of or about 350°C. to 700°C., such as from or about 400°C. to or about 675°C. The temperatures are measured at the maximum temperature in the dehydrogenation zone.

The gaseous reactants may be conducted through the reaction chamber at a fairly wide range of flow rates. The optimum rlow rates will be dependent upon such variables as the temperature of reaction, pressure, particle size, and so forth. Desirable flow rates may be established by one skilled in the art. Generally the flow rates will be within the range of about 0.10 to 10 liquid volumes of the organic compound to be dehydrogenated per volume of dehydrogenation zone containing catalyst per hour (referred to as LHSV). Usually, the LHSV will be between 0.15 and about 5. For calculation, the volume of a fixed bed dehydrogenation zone containing catalyst is that original void volume of reactor space containing catalyst.

The following examples will further illustrate the invention as described above.

EXAMPLE 1

This example illustrates the preparation of a Mg ferrite having a weight ratio of $Fe_2O_3/MgO$ of 9/1 by the process of the invention and its use in oxidative dehydrogenation. A mixture of $Fe_2O_3$ and MgO in the weight ratio of 9:1 was digested in hot (100–150°C.) concentrated HCl. The solution was cooled (approximately 40–50°C.) and 2 percent by weight of potato starch based on the weight of metal oxides was added with stirring. This solution-sol was sprayed into concentrated aqua ammonia (28 percent $NH_3$). A gelatinous precipitate was produced. The precipitate was aged for 1 hour, washed with distilled water by decantation, filtered and dried at 160°C. Two percent by weight of 85 percent $H_3PO_4$ was added to the dried powder. The mixture was tableted (5/32 inch dia.) and dried again. The tableted catalyst was placed in a reactor tube for testing. The reactor was vertical 1 inch diameter IPS stainless steel reaction with a 10 inch catalyst bed. The reactor was purged with nitrogen and brought on stream for the conversion of n-butene-2 to butadiene at a rate of 1.5 (LHSV), and steam/hydrocarbon mole ratio of 16 : 1. Two runs were made at two mole ratios of $O_2$/hydrocarbon. The results are shown below:

TABLE I.

| Time on Stream Hours | [1]$T_i-T_m$ °F. | [2]C/S/Y mole % | Mole ratio $O_2$/HC |
|---|---|---|---|
| 17 | 582–643 | 40/97/39 | 0.25 |
| 20 | 605–810 | 83/95/79 | 0.69 |

[1]$T_i$=inlet temp. $T_m$=maximum temp.
[2]Conversion/Selectivity/Yield

The unexpected aspect of this catalyst in the oxidative dehydrogenation run is the retention of the high selectivity when the conversion was boosted. Comparable data on magnesium ferrites having even the usual Fe$_2$O$_3$/MgO weight ratio of 5/1 but prepared by the conventional method of slurrying Fe$_2$O$_3$ and MgO, dewatering, drying, calcination, reslurrying with 2 weight percent, 85 percent H$_3$PO$_4$ and redrying show butadiene selectivity of 7 – 10 percent absolute lower for the same levels of conversion.

EXAMPLE 2 – 4

A mixture of iron chloride hexahydride and magnesium chloride hexahydrate in a weight ratio of 9 : 1 were dissolved in water at room temperature. To this mixture was added 2% by weight of dextran having a molecular weight of 200,000 – 300,000 based on the calcined catalyst calculated as MgFe$_2$O$_4$. This solution-sol was sprayed into 28% ammonia solution. A gelatinous precipitate was obtained. The precipitate was aged, washed with distilled water, filtered, tableted and dried at 160°C. The catalyst was employed as 3/32 inch O.D. pellets. The same apparatus as in Example 1 was used, the pellets being in a 10 inch fixed bed. The catalyst was activated by heating. Butene-2 was oxidatively dehydrogenated to butadiene in each run. The activation conditions of the run and results are shown in Table II. The feed for each run was 1.5 LHSV.

ratio of 7 : 1 prepared by slurrying Fe$_2$O$_3$ and MgO, forming into 3/32 inch O.D. pellets and calcining at 1580°F. in air, and the catalyst of Example 2. The conditions were the same for both catalyst, i.e. same reactor, bed depth, LHSV, steam/hydrocarbon ratio, except for oxygen to hydrocarbon ratio. In order to obtain comparable temperatures it was necessary to use a higher oxygen to hydrocarbon ratio with the gel precipitated catalyst. As stated before one of the advantages of the catalyst of the present invention is lower operating temperature, however, for a time trend evaluation the temperature should be of the same magnitude because of the effect of temperature on the active life of the catalyst. During the runs the inlet and maximum temperatures for both catalysts varied. The range of the variation is shown. The conditions and time trend results are set out in Table III. The time trend is expressed as the decline in yield per 100 hours on stream. The conventional catalyst was on stream only about 340 hours because of the rapid decline of catalyst activity. The gel precipitated catalyst was on stream for 500 hours. The feed was butene-2 for oxidative dehydrogenation to butadiene.

TABLE III

| CATALYST | LHSV (hr.$^{-1}$) | O$_2$/HC Mole | Steam/HC Mole | T$_i$ °F | T$_m$ °F | Time Trend Decline in Butadiene Yield Mole %/100 hours |
| --- | --- | --- | --- | --- | --- | --- |
| Gel - precipitated from chloride salts, Fe$_2$O$_3$/MgO wt ratio 90:1, 3/32" OD pellets, calcined at 1140 °F in air | 1.5 | 0.85 | 20 | 590/620 | 1025/1090 | –0.24 |
| Mixed oxides Fe$_2$O$_3$/MgO wt ratio 70:1. 3/32" O.D. pellets, calcined at 1580°F in air | 1.5 | 0.55 | 20 | 670/710 | 995/1020 | –1.1 |

EXAMPLE 6 – 8

These examples demonstrate the preparation and use of a non-oxidative dehydrogenation catalyst according to the invention.

The procedure followed in preparing the catalyst was
1. The active metallic ingredients are digested in hot

TABLE II.

| Example | Preparation | Fe$_2$O$_3$/MgO wt. ratio | O$_2$/HC | Stm/HC | T$_i$ °F. | T$_m$ °F. | C | S | Y |
| --- | --- | --- | --- | --- | --- | --- | --- | --- | --- |
| 2 | Gel-Precipitated from chloride salts. Calcined at 1140 °F. in air. | 9.0:1 | 0.55 0.75 0.85 0.95 | 20 20 20 20 | 645 585 595 620 | 920 990 1020 1015 | 59 74 79 80 | 93 92 89 88 | 55 68 70 70 |
| 3 | Gel-Precipitated from chloride salts. Calcined at 1140 °F. in N$_2$. | 9.0:1 | 0.55 0.75 0.85 | 20 20 20 | 635 645 645 | 990 1050 1000 | 59 70 78 | 93 91 89 | 55 64 69 |
| 4 | Gel-Precipitated from chloride salts. Calcined at 1110°F. in air | 9.0:1 | 0.6 0.8 0.9 | 15 15 15 | 623 624 621 | 922 954 1042 | 60 78 79 | 94 91 90 | 56 71 71 |

Ti = inlet temp.
Tm = max temp.
C/S/Y = conversion/selectivity/yield(mole%)
O$_2$/HC = oxygen/hydrocarbon (mole ratio)
Stm/HC = Steam/Hydrocarbon (mole ratio)

EXAMPLE 5

A time trend comparision was made between a conventionally prepared catalyst, i.e. Fe$_2$O$_3$/MgO weight concentrated acid (HCl at approximately 100°–150°C).

2. After complete digestion the gelling agent is added to the hot acid metal solution and thoroughly mixed. In the instant examples 2 percent by weight of gelling agent was added to the active ingredients as a water-gel solution. The gelling agent employed in this instance was Dextran 200* which has a molecular weight of 200,000 – 300,000.

*dextran — available from Gallard-Schlesinger Chem. Mfg. Corp.

3. The metal-acid-gel mixture was then added in a controlled drop fashion to the precipitating agent, ammonium hydroxide and a gel precipitate formed.

4. The gel precipitate was washed and filtered with distilled water to remove ammonia and chlorine.

5. After washing, the gel was dried in a forced air oven, screened to a 45 mesh size, and calcined in an open air furnace at 850°–900°C.

6. The catalyst was then slurried with water, pelleted and dried.

The catalyst were evaluated for the dehydrogenation of ethyl benzene to styrene. For comparison Shell 205 commercial dehydrogenation catalyst was used. The Shell 205 catalyst is believed to be about 85% $Fe_2O_3$ and 15% $K_2O$ (by wt.). Particular processing, special additives, etc. are not known. In any event the catalysts were all tested in the same manner in a pulse microcatalytic reactor.

The apparatus consisted of a conventional gas chromatograph with a small tubular stainless steel fixed bed reactor placed in the carrier gas stream between the sampling valve and the partitioning column. Pulses of reactants were injected at the sample port and mixed with carrier gas (helium) which flowed downward through the one-inch bed of catalyst. The reaction products were immediately separated on a P and E column, Type R (V con - polypropylene operated at 90°C and 20 p.s.i.) and quantatively analyzed via a thermal detector. The carrier gas velocity was constant at 4.6 cc/minute which provided a contact time of approximately 0.2 seconds. The conditions and results of the various dehydrogenations are shown in Table IV.

actor in a 13 cc bed and reduced for one hour at 450°C. After reduction the temperature was lowered to 325°C and steam, air and butene-2 feed started. Mole ratio of steam:oxygen:hydrocarbon 22/0.5/1, LHSV was 1.0. Initial temperatures were 550°–600°F, maximum temperature was 780°F. C/S/Y after four hours on stream was 56/94/52.6. Air was raised to 0.75 and no significant increase in temperature was noted, i.e., maximum 790°C. After 4 hours 20 minutes on stream C/S/Y was 76.6/91/69.7.

The invention claimed is:

1. In a process for the vapor phase oxidative dehydrogenation acyclic non-quaternary hydrocarbons having 4 to 5 contiguous carbon atoms and having at least one

grouping or ethyl benzene to produce a corresponding hydrocarbon having a higher degree of unsaturation with a metal manganese ferrite catalyst wherein the improvement comprises using as the manganese ferrite catalyst a manganese ferrite prepared by preparing a solution of soluble metal components of iron and manganese, adding 0.1 to 4 weight percent of a soluble polyhydric organic compound based on the weight of metal to said solution said polyhydric compound having number average molecular weight of about 3000 to 400,000 and further being selected from the group consisting of polyesters derived from polybasic carboxylic acids and polyols; polyethers being the condensation products of ethylene oxide, propylene oxide and mixtures thereof with polyols; polysaccharides and mixtures thereof, contacting said solution of soluble metal components and polyhydric organic compound with a precipitating agent at a temperature in the range of 20° to 100°C and at a pressure of 0.5 to 50 atmospheres to precipitate insoluble metal component of iron and manganese, recovering a gelatinous material, and heating said gelatinous material to form manganese ferrite.

TABLE IV

| Example | Catalyst* | °F Temp. | Sample Size Microliters/Pulse | C | S | Y |
|---|---|---|---|---|---|---|
| | | | | Mole % Styrene | | |
| 6 | 80% $MgFe_2O_4$ (ratio $Fe_2O_3$/MgO 4.5:1), 5% $K_2CO_3$, 15% $CrCl_3$ | 650 | 3:00 | 77 | 98 | 76 |
| 7 | 70% $MgFe_2O_4$ (ratio $Fe_2O_3$/MgO 4.5:1), 5% $K_2CO_3$, 25% $ZnCrO_4$ | 740 | 3:00 | 88 | 99 | 87 |
| 8 | Shell 205 | 860 | 3:00 | 40 | 91 | 36 |
| | | 970 | 3:00 | 83 | 88 | 74 |

*wt.%

EXAMPLE 9

A mixture of iron chloride hexahydrate and manganese chloride hexahydrate in a weight ratio of 2:1 was dissolved in water at room temperature dextran (MW 200,000–300,000 was added to give 5 wt.%) based on the weight $MnFe_2O_4$ (calculated) in the finished catalyst. This solution was sprayed into 28% ammonia solution. A gelatinous precipitate was obtained, which was aged for 30 minutes, washed with distilled water, filtered, slurried with solution of 85% $H_3PO_4$ (approximately 1%), coated onto 7–10 mesh AMC (alumina supports, Carbondum Company) and dried at 140°C.

The dried pellets were loaded into a 1 inch Vycor re-

2. The process according to claim 1 wherein said polyhydric compound is a polyester or polyether.

3. The process according to claim 1 wherein said polyhydric compound is a polysaccharide.

4. The process according to claim 3 wherein said polysaccharide is branched.

5. The process according to claim 4 wherein the polysaccharide has a 1–4, 1–6 or mixed glycoside linkage.

6. The process according to claim 4 wherein said polysaccharide is selected from the group consisting of potato starch, corn starch, tapioca starch, arrowroot starch, gum arabic, gum tragacanth and dextran.

7. The process according to claim 3 wherein the soluble metal component is iron chloride and manganese chloride in water and the precipitating agent is an alkaline solution.

8. The process according to claim 3 wherein the hydrocarbons are n-butenes.

9. The process of claim 1 wherein the insoluble metal component is an oxide, mixture of oxides or compounds that are the precursors of oxides.

* * * * *

UNITED STATES PATENT OFFICE
CERTIFICATE OF CORRECTION

PATENT NO. : 3,900,525
DATED : August 19, 1975
INVENTOR(S) : Harold F. Christmann and Paul H. Teel It is certified that error appears in the above-identified patent and that said Letters Patent are hereby corrected as shown below:

Col. 2, line 44 reads "2,437,703" but should read --- 3,437,703 ---.

Col. 3, line 41 reads "ferrites of may" but should read --- ferrites or may ---.

Col. 4, line 32 reads "0.16 $^{O\cdot}$" but should read --- 0.16 $^{O}2$ ---.

Col. 5, line 20 reads "stoichometric" but should read --- stoichiometric ---.

Col. 6, line 33 reads "physica" but should read --- physical ---. (Col. 6, starting with line 33, last words cut off)

Col. 6, line 44 reads "must be kept employed" but should read --- must be employed ---.

Col. 7, line 9 reads "of at least 3000" but should read --- of at least about 3000 ---.

Col. 8, line 5 reads "gun arabic, gun tragacanth" but should read --- gum arabic, gum tragacanth ---.

Col. 8, line 36 reads "increase solubility" but should read --- increase their solubility ---.

Col. 9, line 3 reads "from the molecular" but should read --- from the high molecular ---.

UNITED STATES PATENT OFFICE
CERTIFICATE OF CORRECTION

PATENT NO. : 3,900,525
DATED : August 19, 1975
INVENTOR(S) : Harold F. Christmann and Paul H. Teel It is certified that error appears in the above-identified patent and that said Letters Patent are hereby corrected as shown below:

Col. 9, line 14 reads "cylindrical tape catalyst" but should read --- cylindrical type catalyst ---.

Col. 9, line 50 reads "improvmement" but should read --- improvement ---.

Col. 9, line 61 reads "reprducing" but should read --- reproducing ---.

Col. 9, line 65 reads "value" but should read --- valuable ---.

Col. 10, all lines, last words in column cut off.

Col. 10, line 12 reads "nirogen" but should read --- nitrogen ---.

Col. 10, line 14 reads "carbons atoms" but should read --- carbon atoms ---.

Col. 10, line 27 reads "isopropylbenzenene" but should read --- isopropylbenzene ---.

Table III under heading "Catalysts" third line reads "90:1" but should read --- 9.0:1 --- and seventh line reads "70:1" but should read --- 7.0:1 ---.

Table IV under heading "Catalyst", example 7 reads "$Fe_2O_3MgO$" but should read --- $Fe_2O_3/MgO$ ---.

Signed and Sealed this thirtieth Day of March 1976

[SEAL]

Attest:

RUTH C. MASON
*Attesting Officer*

C. MARSHALL DANN
*Commissioner of Patents and Trademarks*